(12) United States Patent
Fultz et al.

(10) Patent No.: US 8,812,899 B1
(45) Date of Patent: Aug. 19, 2014

(54) MANAGING READ CACHING

(75) Inventors: Phillip P. Fultz, Clinton, MA (US); Kiran Madnani, Santa Clara, CA (US); Manpreet Singh, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 84 days.

(21) Appl. No.: 13/248,068

(22) Filed: Sep. 29, 2011

(51) Int. Cl.
*G06F 11/00* (2006.01)

(52) U.S. Cl.
USPC .................................................. 714/6.1

(58) Field of Classification Search
USPC .................................................. 714/6.1
See application file for complete search history.

(56) References Cited

U.S. PATENT DOCUMENTS

| | | | | |
|---|---|---|---|---|
| 7,793,061 | B1 * | 9/2010 | Gupta et al. | 711/162 |
| 2003/0158999 | A1 * | 8/2003 | Hauck et al. | 711/113 |
| 2006/0212645 | A1 * | 9/2006 | Petersen et al. | 711/103 |
| 2011/0022801 | A1 * | 1/2011 | Flynn | 711/120 |
| 2012/0210068 | A1 * | 8/2012 | Joshi et al. | 711/122 |
| 2012/0304171 | A1 * | 11/2012 | Joshi et al. | 718/1 |

* cited by examiner

*Primary Examiner* — Yair Leibovich
(74) *Attorney, Agent, or Firm* — Krishnendu Gupta; Jason A. Reyes; John T. Hurley

(57) ABSTRACT

A method is used in managing read caching. First and second read caches are maintained in a data storage system. The first read cache is controlled by a first storage controller and the second read cache is controlled by a second storage controller. Read cache data is copied from the first storage controller to the second storage controller. A failure of the first storage controller is detected. Based on the detection, the copied read cache data is processed at the second storage controller to make the copied read cache data available for use at the second storage controller.

18 Claims, 5 Drawing Sheets

MANAGING READ CACHING

BACKGROUND

1. Technical Field

This application relates to managing read caching.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

The data storage system may utilize a variety of different techniques such as caching. With caching, the data storage system may cache data from the physical disk drives within its storage cache. As known in the art, the cache used in the data storage system may be implemented using a fast, volatile memory, such as RAM (random access memory), particularly dynamic RAM (DRAM).

It should be noted that a data storage system may include multiple storage processors (also referred to as storage controllers) storing data to a same set of storage devices. Each of the storage processors may have its own cache so that cached data may be mirrored in the caches of the storage processors. Multiple storage processors may be desirable for use in providing fault tolerance, higher throughput, and the like.

In a particular example, as is known in the art, large host computer systems require large capacity data storage systems. These large computer systems generally include data processors which perform many operations on data introduced to the computer system through peripherals including the data storage system. The results of these operations are output to peripherals, including the storage system.

In accordance with the example, one type of data storage system is a magnetic disk storage system. Here a bank of disk drives and the computer system are coupled together through an interface. The interface includes "front end" directors (or controllers) and "back end" disk directors (or controllers, also known as rear end directors or disk directors). The interface operates the directors in such a way that they are transparent to the computer. That is, data is stored in, and retrieved from, the bank of disk drives in such a way that the computer system merely thinks it is operating with one large memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the front-end directors and disk directors, an addressable global cache memory. The global cache memory is a semiconductor memory connected to all of the front end directors and back end directors and is provided to rapidly store data from the computer system before storage in the disk drives, and, on the other hand, store data from the disk drives prior to being sent to the computer. The cache memory being a semiconductor memory, as distinguished from a magnetic memory as in the case of the disk drives, is much faster than the disk drives in reading and writing data.

A read cache may be used for staging/prefetching data for fulfilling data read requests received from a host. For example, a data storage system having a read cache function allows a cache memory to receive data from a disk address designated by a read request. When another read request is issued to read the data from the disk address, the data is read not from the disk but instead from the cache memory for transfer to an interface. Because it is not necessary to wait for the disk to rotate every time to reach appropriate positions or otherwise wait for disk access, high-speed data transmission is effected.

In an example, a data storage system has a pair of storage processors connected to an array of disk drives. For example, such a system is disclosed in U.S. Pat. No. 5,922,077, which is hereby incorporated by reference herein, and which describes a dual data storage controller system in which the controllers are connected to one another by a peer-to-peer communication link. Each data storage controller is connected to a fibre channel loop in connection with each of the disk drives in the disk array. Fail-over switches provide each data storage controller with a means for connecting to either one of the fibre channel loops.

Each storage processor has its own cache memory and the two storage processors may be configured to communicate with each other through a Cache Mirroring Interface (CMI) bus in the peer-to-peer communication link in order to maintain cache coherency. In particular, the CMI bus enables a copy of data to be available on both storage processing units before a disk write operation is complete. In this system, a first storage processing unit has a first CMI interface circuit, a second storage processing unit has a second CMI interface circuit, and the first and second CMI interface circuits connect to each other through the CMI bus.

The nature of non-volatile, vibration-free, small size and low power consumption has made flash memory an excellent component to be utilized in various flash storage devices. Flash storage devices are widely used as memory storage for computer and consumer system products such as notebook, desktop computer, set top box, digital camera, mobile phone, PDA and GPS etc. The increasing demand for more storage in these products has driven the need to expand the capacity of the flash storage devices.

SUMMARY OF THE INVENTION

A method is used in managing read caching. First and second read caches are maintained in a data storage system.

The first read cache is controlled by a first storage controller and the second read cache is controlled by a second storage controller. Read cache data is copied from the first storage controller to the second storage controller. A failure of the first storage controller is detected. Based on the detection, the copied read cache data is processed at the second storage controller to make the copied read cache data available for use at the second storage controller.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing read caching, which technique may be used to provide, for example, a method to enable read cache warm failover for storage controller based flash devices using data reduction techniques asynchronously.

Conventionally, caches are typically built out of DRAM memory, which is volatile and requires a lot of standby power. It is also conventionally designed as a function within a controller design, and therefore must be duplicated in high-availability architectures to be able to seamlessly handle controller failures with no loss of data. During a power loss, conventionally the DRAM data must be copied into some other non-volatile memory in order not to lose it, requiring batteries or some other form of short-term energy storage to affect the transition.

Flash memory is slower than DRAM but much faster than magnetic hard disk, making flash memory a good candidate for caching data. Flash memory is also nonvolatile, which avoids some complications. The lower cost of flash memory as compared to DRAM also means that more cache can be provided at reasonable cost, making the cache more effective and at least partially mitigating the lower speed.

Figure 1:
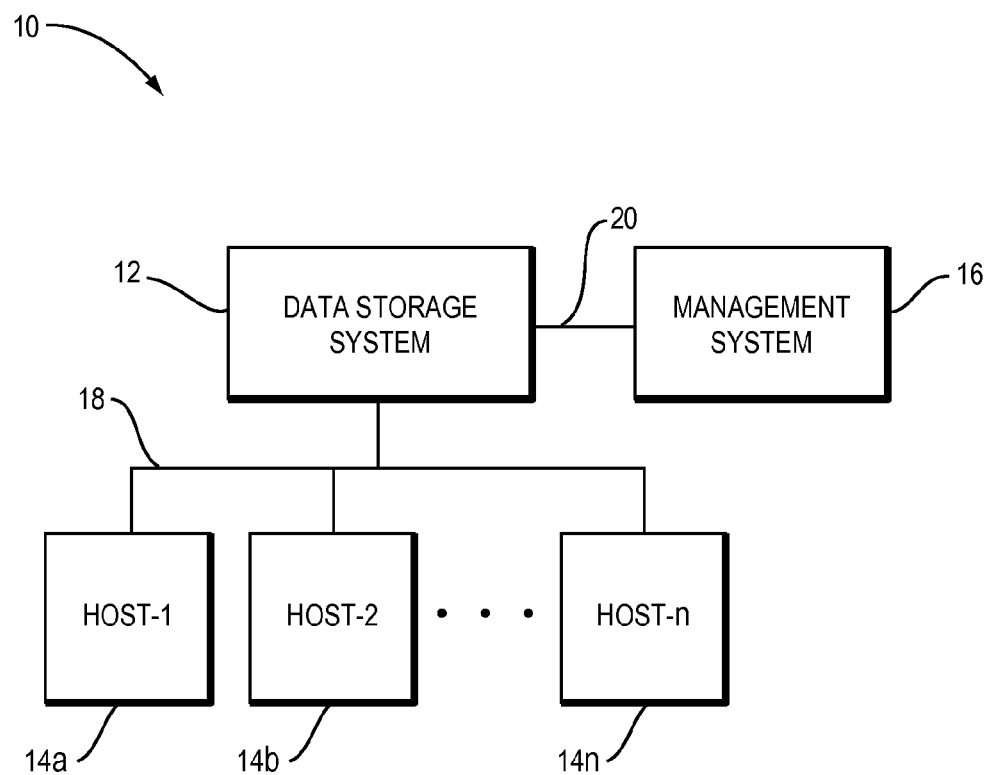
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

Figure 2:
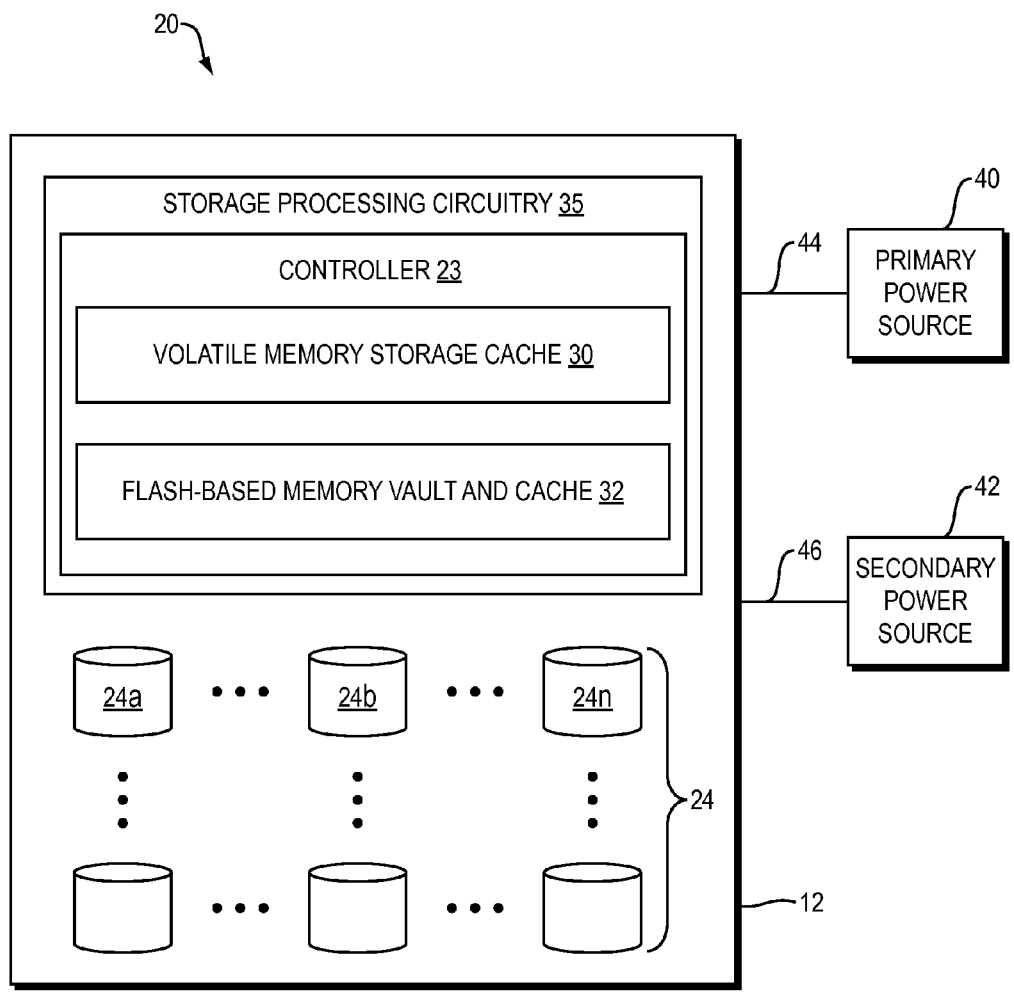
FIG. 2 is a diagram illustrating in more detail components that may be used in connection with techniques herein.

Referring to FIG. 2, shown is a more detailed representation of components that may be included in an embodiment using the techniques herein. In the example 20, a data storage system 12 may include disks 24 accessed by logical volumes as described above. The data storage system 12 may also include one or more controllers 23, one or more volatile memory caches 30, and one or more flash-based caches 32.

Each of the one or more volatile memory (VM) storage caches 30 may include any one or more different types of volatile memory, such as RAM. The one or more flash-based memory caches 32 are flash-based memory which is non-volatile to store data persistently. Caches 32 may be used as read caches in accordance with techniques herein.

The controller 23 may be configured to perform data storage operations on behalf of the hosts of FIG. 1 during normal operation using the volatile memory storage cache 30, the flash-based cache 30, and the disks 24. As described above during normal operation, when a host sends a request to read data from the data storage system, the controller 23 attempts to read the data of the read request from the VM cache 30 and/or from a portion of the component 32.

As will be appreciated by those skilled in the art, the data storage 12 may also include other components than as described for purposes of illustrating the techniques herein.

Figure 3:
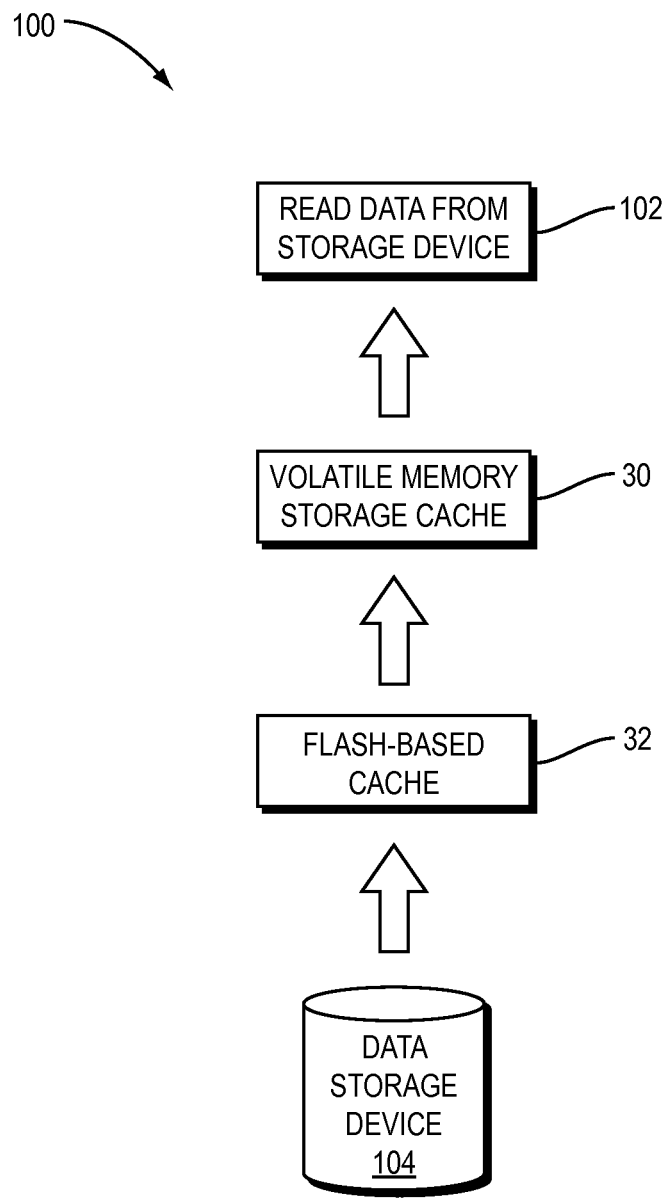
FIGS. 3, 5 are flow diagrams of procedures for use with the computer system of FIGS. 1-2.

Referring to FIG. 3, shown is a flow diagram illustrating an example of flow of data in the data storage system. During normal processing as described herein, the read data requested from the host 102 may be read from disks 24 and/or cached in the VM cache 30 and/or cache 32. At least some data is copied from the VM cache 30 and/or disks 24 to a portion of the flash-based cache 32 so that at least some read requests may be satisfied by cache 32 without requiring reading from disks 24.

Figure 4:
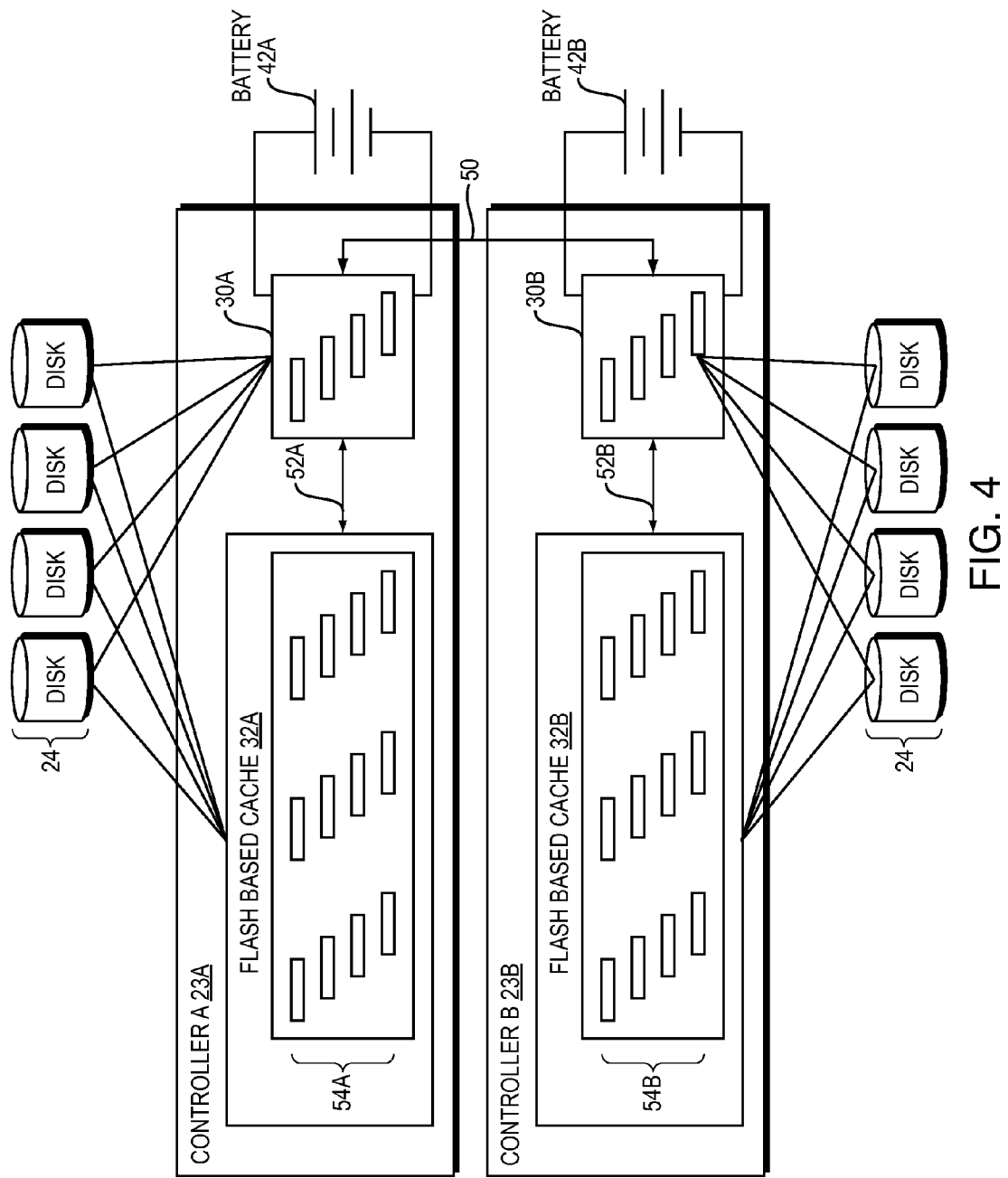
FIG. 4 is a block diagram of a specific implementation of the computer system of FIGS. 1-2.

FIG. 4 illustrates a specific implementation of the data storage system of FIG. 2, in which dual controllers 23A, 23B have respective DRAM-based VM caches 30A, 30B communicating via a cache mirroring interface 50 and supported by respective secondary power sources (e.g., batteries) 42A, 42B. Controllers 23A, 23B communicate over links 52A, 52B (e.g., one or more PCI busses) with respective flash based cache components 32A, 32B which have flash-based memory including modular memory such as flash-based units 54A, 54B respectively. Components 32A, 32B and controllers 23A, 23B communicate with disks 24.

The arrangement of FIG. 4 may be used advantageously in one or more of multiple different ways, allowing higher performance lower cost data storage systems to be provided. For example, components 32A, 32B may serve as an extension of VM caches 30A, 30B, making at least a portion of the overall cache nonvolatile and making it scalable through addition of more flash-based cache, e.g., more flash-based memory modules. In particular, cached data in components 32A, 32B can be prepared for controller failure by use of the technique described herein.

In another example, the handling of host I/Os may be partitioned, so that some I/Os are processed using VM caches 30A, 30B, and some are processed using component 32.

By use of the technique described herein, if controller 23A fails, controller 23B can carry on using cached data originally from component 32A as long as any necessary context switching has been successful and mirroring interface 50 has previously been successful in maintaining communication with component 32A.

Components 32A, 32B may use any form factor with ports for connection over links 52A, 52B to both controllers 23A, 23B, e.g., PCI, SAS, Fibre Channel, and/or an internal fabric.

The nonvolatile nature of each component 32A, 32B allows its large capacity to be used as a cache while avoiding some problems of a DRAM cache of the same size. For example, since DRAM is volatile, secondary power source 42 is needed in the event of a failure of primary power source 40 so that the data in VM cache 30 can be preserved long enough to be copied out in a vaulting operation to nonvolatile memory such as disk. The larger the VM cache, the more data needs to be copied out, and the larger the secondary power source needs to be and/or the faster the copying needs to be, which can be an engineering challenge. However, since each component 32A, 32B is nonvolatile, it is effectively its own vault in the event of power failure.

The larger the cache, the more the cache can be used for sophisticated caching schemes to increase the performance of the system, especially by use of metadata, e.g., describing how and when data is being used. For example, if a midrange data storage system has 600 GB of flash-memory based caching, techniques beyond standard prefetching may be used to increase the chance that data being used is available in the cache as often as possible. In addition or instead, if each component 32A, 32B is large, space can be made there to hold information that the system needs when it is first turned on or booted up, so that such information is available much earlier than is the case if such information is loaded from disks which must be spun up and initialized.

In general, since a cache based on components 32A, 32B can be made large without at least some of the disadvantages of making caches 30A, 30B large as discussed above, the system can make use of the space in the cache to apply techniques to increase the performance of the system beyond conventional prefetching, such as sophisticated techniques to determine what should be kept in the cache and how long data should remain the cache, and/or to track when data is flushed out. For example, if the system determines that a particular dataset is used at the same time every day (e.g., overnight), the system can cause the dataset to be loaded into cache at an appropriate time. Overall, if the cache is large enough to hold all or nearly all of the data that applications need at any particular time, it becomes less important whether prefetching based on prediction is successful.

In another advantage, flash-based components 32A, 32B use much less power than DRAM-based caches, and in at least one implementation one or more portions of components 32A, 32B may be turned off if not needed, to conserve energy, without risk of losing data in components 32A, 32B, and can be accessed when needed with little delay (e.g., milliseconds) after re-powerup. Also for power savings, in the case of a large cache based on components 32A, 32B, the system may apply a strategy that favors power savings over throughput performance, so that, for example, one or more of disk drives 24 are turned off once data from such one or more drives is loaded into components 32A, 32B, and the drives are not turned back on until data is needed that is not already available from components 32A, 32B. In another variation, only a limited working dataset is presented to the host at one time, so that when the host switches executing applications, data related to the old application is flushed from components 32A, 32B to appropriate disks, which are then turned off, and data related to the new application is loaded into components 32A, 32B from disk. In general, components 32A, 32B may be used as paging devices.

As described below, the technique described herein helps provide a method to enable read cache warm failover for storage controller based flash devices using data reduction techniques asynchronously.

In a current situation, flash devices are becoming even more prevalent in various form factors such as SSD, PCI, and DIMMs, and multi-core processors are a norm, with the number of cores expected to consistently scale up, providing ample compute resources.

For use with the technique, a system such as the system of FIG. 4 has data reduction logic for techniques such as compression and de-duplication (collectively referred to herein as "compression"), components 32A, 32B or other flash-based device (e.g., PCI-flash-based devices) being used as second level cache, and interface 50 or other interconnect between controllers 23A, 23B.

While the performance characteristics obtained from controller-based flash devices is superior to that obtained from SSDs, the former cannot be readily accessed across storage controllers. When a storage controller fails, is reset or there is a LUN trespass (i.e., control of a LUN is transferred from one storage controller to another storage controller), the storage controller based flash based read cache is not accessible to the other storage controller. Conventionally, this requires the other storage controller to warm up its own flash based read cache for the affected LUNs, and as a result, the hosts lose read cache performance for those LUNs in the meantime.

In accordance with the technique described herein, an example high level solution involves asynchronously transferring a copy of compressed segments of the local storage controller's controller-based flash read cache to the peer's storage controller controller-based flash cache. Operation is as follows.

1.) While both storage controllers 23A, 23B are online, data being promoted from disks 24 to flash-based cache 32A is compressed real-time and the compressed cache data is sent across the CMI channel 50 to be stored on the peer controller's flash-based cache 32B.

2.) When controller 23A fails, the compressed cache data stored in cache 32B is uncompressed and immediately made available to the host. In at least some implementations, the decompression processing is offloaded to and performed by non-busy cores of a CPU of controller 23B.

3.) Read cache performance is regained as soon as the read cache data is uncompressed.

In at least one embodiment, dirty data is resident in the mirrored DRAM cache. When the DRAM cache flushes this dirty data to the flash-based cache, the peer storage processor also flushes its mirrored copy to its local flash-based cache device.

The solution may have one or more of the following benefits.

1.) The impact to read performance is reduced on failure of a storage controller. On failover, the compressed data in the peer controller's flash-based cache is immediately decompressed and can be prioritized based on host access.

2.) Compressing the read cache data before sending it to the peer storage processor helps reduce the bandwidth cost of sending the peer's read cache data across the CMI channel.

3.) Compression also reduces the amount of cache consumed in storing the peer's read cache data.

4.) Using readily available CPU cores improves array utilization and provides higher value to the customer.

5.) Since only read data in the flash-based cache is being replicated, the operation need not be synchronous (especially during heavy workload conditions).

Figure 5:
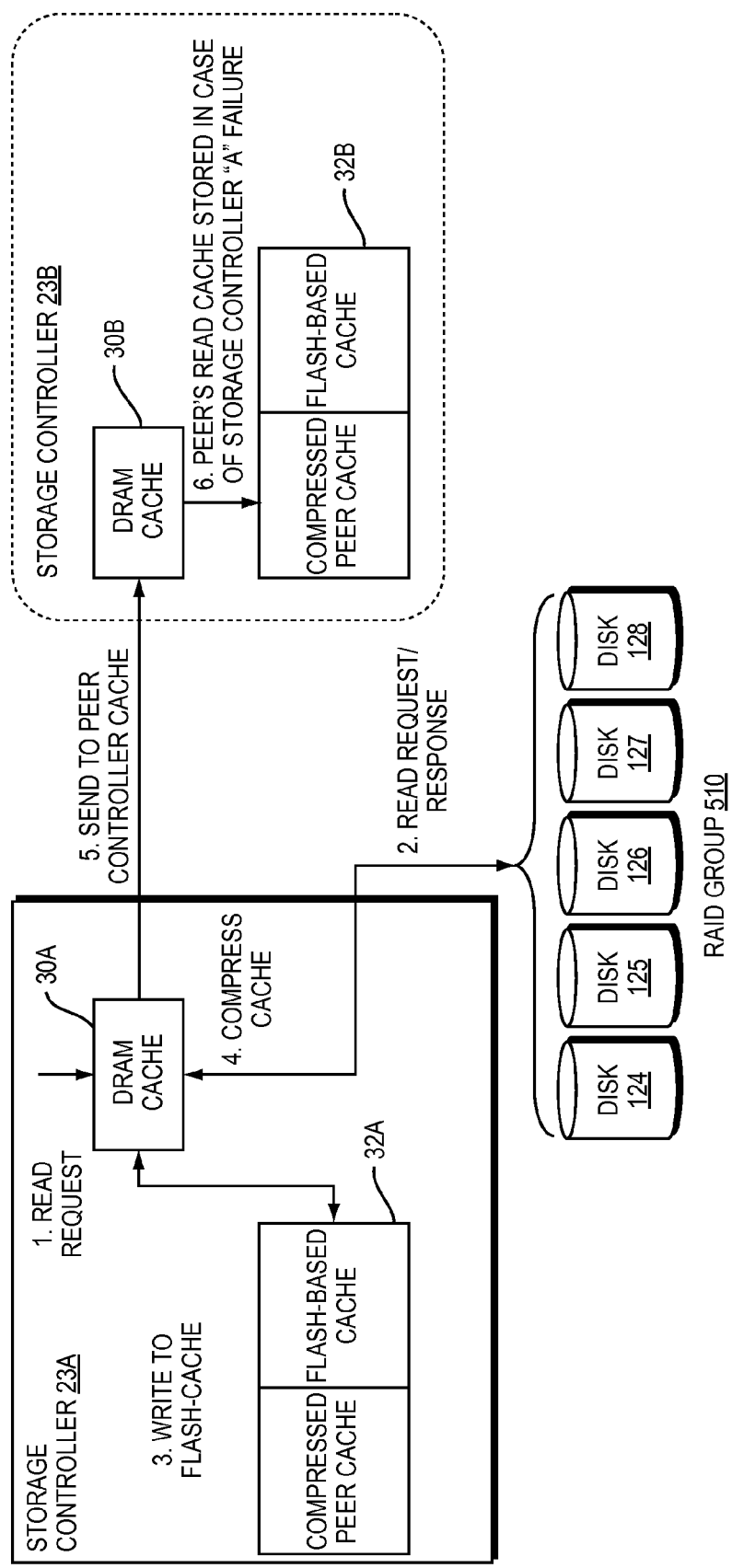

FIG. 5 illustrates an example order of operations:

1. Host requests a read for a LUN in RAID group 510 having drives 124-128 of drives 24. The request enters cache 30A on storage controller 23A.
2. The data does not reside in cache 30A, so the read is requested to drives 124-128. The request is serviced and data is read into cache 30A and a response is sent to the host.
3. The DRAM read cache contents of cache 30A are written to local flash-based cache 32A based on the criteria set forth by policies and processes in force at the time (for example, two access to the same chunks may result in the chunk being promoted/copied to cache 32A).
4. The read segments of cache 32A are compressed to create compressed cache data.
5. The compressed cache data is transferred over link 50 to peer storage controller 23B.
6. Peer storage controller 32B writes the compressed cache data to its flash-based cache 32B.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing read caching, the method comprising:
   maintaining first and second flash-based read caches in a data storage system, the first read cache being controlled by a first storage controller and the second read cache being controlled by a second storage controller;
   compressing read segments of the read cache data to create compressed read cache data;
   copying the compressed read cache data from the first read cache of the first storage controller to the second read cache of the second storage controller;
   detecting a failure of the first storage controller; and
   based on the detection, processing the copied read cache data at the second storage controller to make the copied read cache data available for use at the second storage controller, wherein the copied read cache data stored is uncompressed and made available to a host.

2. The method of claim 1, wherein data reduction techniques are used asynchronously for read cache warm failover for the first storage controller.

3. The method of claim 1, wherein a copy of compressed segments of the first read cache is transferred to the second read cache.

4. The method of claim 1, wherein the read cache data is compressed real-time and is sent across a CMI channel to be stored in the second read cache.

5. The method of claim 1, wherein the processing is offloaded to and performed by non-busy cores of a CPU of the second storage controller.

6. The method of claim 1, wherein when the first read cache flushes dirty data to a flash-based cache, the second read cache also flushes the copied read cache data to another flash-based cache device.

7. The method of claim 1, wherein the copying of the read cache data is performed asynchronously.

8. The method of claim 1, wherein data is read into the first read cache when a read request is made to drives.

9. The method of claim 1, wherein the read cache data is written to flash-based cache based on criteria set forth by policies and processes in force at the time.

10. A system for use in managing read caching, the system comprising:
    first hardware logic configured to maintain first and second flash-based read caches in a data storage system, the first read cache being controlled by a first storage controller and the second read cache being controlled by a second storage controller;
    second hardware logic configured to compress read segments of the read cache data to create compressed read cache data and copy the read cache data from the first storage controller to the second storage controller;
    third hardware logic configured to detect a failure of the first storage controller; and
    fourth hardware logic configured to process, based on the detection, the copied read cache data at the second storage controller to make the copied read cache data available for use at the second storage controller, wherein the copied read cache data stored is uncompressed and made available to a host.

11. The system of claim 10, wherein data reduction techniques are used asynchronously for read cache warm failover for the first storage controller.

12. The system of claim 10, wherein a copy of compressed segments of the first read cache is transferred to the second read cache.

13. The system of claim 10, wherein the read cache data is compressed real-time and is sent across a CMI channel to be stored in the second read cache.

14. The system of claim 10, wherein the processing is offloaded to and performed by non-busy cores of a CPU of the second storage controller.

15. The system of claim 10, wherein when the first read cache flushes dirty data to a flash-based cache, the second read cache also flushes the copied read cache data to another flash-based cache device.

16. The system of claim 10, wherein the copying of the read cache data is performed asynchronously.

17. The system of claim 10, wherein data is read into the first read cache when a read request is made to drives.

18. The system of claim 10, wherein the read cache data is written to flash-based cache based on criteria set forth by policies and processes in force at the time.

\* \* \* \* \*